United States Patent Office 3,277,093
Patented Oct. 4, 1966

3,277,093
(OPTIONALLY-2-SUBSTITUTED) 4-HALOPHENYL-5,7-DIKETO - 6 - ALKYLTHIAZOLO[4,5-d]PYRIMIDINES
Elmer F. Schroeder, Chicago, Ill., assignor to G. D. Searle & Co., Chicago, Ill., a corporation of Delaware
No Drawing. Filed Aug. 2, 1965, Ser. No. 476,643
13 Claims. (Cl. 260—256.5)

The present invention is concerned with novel chemical compounds characterized by a halophenyl substituent attached to a bicyclic structure in which the rings are nitrogen and sulfur containing heterocycles. More particularly, the compounds of this invention are (optionally-2-substituted) 4 - halophenyl-5,7-diketo-6-alkylthiazolo(4,5-d]pyrimidines which can be represented by the following structural formula

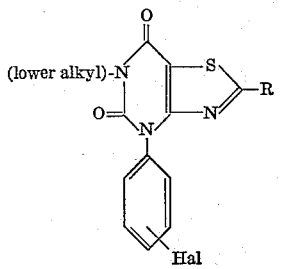

wherein R can be hydrogen, an amino, carboxy or (lower alkoxy)carbonyl radical or a radical represented by the following formula

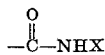

X being hydrogen or a lower alkyl or phenyl(lower alkyl) group.

The term Hal encompasses the halogen family, i.e. fluorine, chlorine, bromine and iodine.

The lower alkoxy radicals denoted in the foregoing structural representation are typified by methoxy, ethoxy, propoxy, butoxy, pentyloxy, hexyloxy, heptyloxy and the branched-chain groups isomeric therewith.

Illustrative of the lower alkyl radicals encompassed in that formula are methyl, ethyl, propyl, butyl, pentyl, hexyl, heptyl and the branched-chain isomers corresponding.

A convenient method for manufacture of the compounds of the present invention utilizes as starting materials compounds of the formula

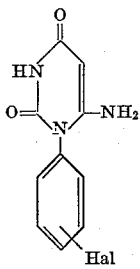

wherein the symbol Hal is as hereinbefore defined. When those starting materials are contacted with a suitable alkylating agent, i.e. a lower alkyl halide or dialkyl sulfate, preferably in the presence of an acid acceptor such as pyridine, triethylamine or sodium hydroxide, the 3-alkylated derivatives corresponding are produced. Illustrative of that process is the reaction of 1-p-chlorophenyl - 6 - amino-1,2,3,4-tetrahydropyrimidine-2,4-dione with dimethyl sulfate in aqueous sodium hydroxide at elevated temperature to produce 1-p-chlorophenyl-3-methyl - 6 - amino-1,2,3,4-tetrahydropyrimidine-2,4-dione. Insertion of a halo substituent at the 5-position of those alkylated derivatives is typified by reaction of the latter 1 - p - chlorophenyl-3-methyl-6-amino-1,2,3,4-tetrahydropyrimidine-2,4-dione with chlorine in carbon tetrachloride, thus affording 1-p-chlorophenyl-3-methyl-5-chloro-6-amino-1,2,3,4-tetrahydropyrimidine-2,4-dione. The 5-halo substituent of those intermediates is replaced by a carboxyalkylthio group when heated with the appropriate mercaptoalkyl carboxylic acid in the presence of an alkaline catalyst. A specific example of that process is the reaction of 1-p-chlorophenyl-3-methyl-5-chloro-6-amino-1,2,3,4-tetrahydropyrimidine-2,4-dione with mercaptoacetic acid in aqueous propanolic sodium hydroxide, in that manner providing 1-p-chlorophenyl-3-methyl-5-carboxymethylthio - 6 - amino-1,2,3,4-tetrahydropyrimidine-2,4-dione. Cyclization of those amino acids is exemplified by heating the latter intermediate with acetic anhydride at 90–100° for several hours to yield 5-p-chlorophenyl - 7 - methyl - 3,6,8 - triketopyrimido[5,4-b]1,4-thiazine. Chlorination and hydrolysis of the resulting dichloro derivative results in the 2,3,6,8-tetraketo compounds corresponding to the latter triketo substances. By that procedure, 5-p-chlorophenyl-7-methyl-3,6,8-triketopyrimido[5,4-b]1,4-thiazine is converted to 5-p-chlorophenyl - 7 - methyl-2,3,6,8-tetraketopyrimido[5,4-b]1,4-thiazine.

The 2-(lower alkoxy)carbonyl compounds of the present invention are produced by reaction of the above described 2,3,6,8-tetraketo compounds with the appropriate alkanol, suitably at the reflux temperature of the mixture. Thus, when 5-p-chlorophenyl-7-methyl-2,3,6,8-tetraketopyrimido[5,4-b]1,4-thiazine is heated in ethanol solution, the instant 2-ethoxycarbonyl-4-p-chlorophenyl-5,7-diketo-6-methylthiazolo[4,5-d]pyrimidine is obtained.

The 2-(optionally substituted) carbamoyl compounds of this invention are conveniently prepared by two alternative procedures, involving, on the one hand, use of the aforementioned 2,3,6,8-tetraketo intermediates and, on the other hand, use of the above described 2-(lower alkoxy)carbonyl derivatives. The former procedure is exemplified by the reaction of 5-p-chlorophenyl-7-methyl-2,3,6,8-tetraketopyrimido[5,4-b]1,4-thiazine with propylamine in aqueous medium, in that manner affording 2 - N - propylcarbamoyl - 4 - p - chlorophenyl-5,7-diketo-6-methylthiazolo[4,5-d]pyrimidine. Illustrative of the latter procedure is the reaction of 2-ethoxycarbonyl-4-p-chlorophenyl - 5,7 - diketo - 6 - methylthiazolo[4,5-d] pyrimidine with concentrated ammonium hydroxide in ethanol at room temperature, thus producing 2-carbamoyl - 4 - p - chlorophenyl - 5,7 - diketo - 6 - methylthiazolo[4,5-d]pyrimidine.

Hydrolysis of the instant 2-(lower alkoxy)carbonyl compounds, for example in aqueous sodium hydroxide, is a convenient procedure for manufacture of the corresponding 2-carboxy substances. The above described 2-ethoxycarbonyl - 4 - p - chlorophenyl - 5,7 - diketo - 6 - methylthiazolo[4,5-d]pyrimidine, in that manner, is converted to 2 - carboxy - 4 - p - -chlorophenyl-5,7-diketo-6-methylthiazolo[4,5-d]pyrimidine. Heating of those carboxy derivatives at an elevated temperature results in evolution of carbon dioxide, thus providing the 2-unsubstituted substances of the present invention. As a specific example, 2 - carboxy - 4 - p-chlorophenyl - 5,7 - diketo - 6 - methylthiazolo[4,5-d]pyrimidine is heated at about 80° over a period of approximately 96 hours, thus providing 4 - p - chlorophenyl - 5,7-diketo-6-methylthiazolo[4,5-d] pyrimidine.

The 2-amino compounds of this invention are produced by heating a 1-halophenyl-3-alkyl-5-halo-6-amino-1,2,3,4-tetrahydropyrimidine - 2,4 - dione intermediate, selected from those described hereinbefore, with an alkali metal thiocyanate at an elevated temperature for several hours, during which reaction period the initially formed 5-thiocyanato derivative cyclizes to yield the desired product. Typically, 1 - p - chlorophenyl - 3 - methyl - 5 - bromo- 6 - amino - 1,2,3,4 - tetrahydropyrimidine - 2,4 - dione is heated in ethanol with sodium thiocyanate to afford, as an unisolated intermediate, 1-p-chlorophenyl-3-methyl-5 - thiocyanato - 6 - amino - 1,2,3,4 - tetrahydropyrimidine-2,4-dione, which cyclizes upon continued heating, thus affording 2-amino-4-p-chlorophenyl-6-methyl-5,7-diketothiazolo[4,5-d]pyrimidine.

The compounds of this invention exhibit valuable pharmacological properties. Thus, they possess hormonal activity, for example anti-inflammatory, as is evidenced by their ability to inhibit the local edema formation characteristic of inflammatory states. They are also diuretic agents in consequence of their capacity for promoting urine excretion. In addition, the present compounds are characterized by anti-protozoal activity as demonstrated by their ability to inhibit the growth of such organisms as *Tetrahymena gelleii*.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples, temperatures are given in degrees centigrade (° C.), and quantities of materials are expressed in parts by weight except where otherwise noted.

*Example 1*

A mixture containing 23.8 parts of 1-p-chlorophenyl-6-amino-1,2,3,4-tetrahydropyrimidine-2,4-dione, 8 parts of sodium hydroxide and 240 parts of water is heated to about 60° in order to achieve homogeniety, following which time 17.3 parts of dimethyl sulfate is added dropwise over a period of about 10 minutes. That reaction mixture is then heated at 70–75° for about 15 minutes, then is allowed to cool to room temperature over a period for several hours. The precipitated solid which forms is isolated by filtration, then washed on the filter with water and dried in air. Recrystallization from ethanol affords colorless crystals of pure 1-p-chlorophenyl-3-methyl-6-amino-1,2,3,4-tetrahydropyrimidine-2,4-dione, melting at about 284–285°.

*Example 2*

To a mixture of 25.2 parts of 1-p-chlorophenyl-3-methyl - 6 - amino - 1,2,3,4 - tetrahydropyrimidine - 2,4-dione, 9.24 parts of sodium bicarbonate and 320 parts of methanol is added, with stirring over a period of about 40 minutes, an ice-cold solution of 7.1 parts of chlorine dissolved in 96 parts of carbon tetrachloride. That chlorination mixture is then stirred for approximately 30 minutes longer, at the end of which time it is filtered in order to remove insoluble inorganic salts. The filtrate thus obtained is partially concentrated by distillation under reduced pressure, then is cooled and allowed to stand at room temperature for several hours. The crystalline solid which forms is collected by filtration, washed thoroughly on the filter with water then further purified by recrystallization from ethanol to produce colorless crystals of pure 1-p-chlorophenyl-3-methyl-5-chloro-6-amino-1,2,3,4-tetrahydropyrimidine-2,4-dione, melting at about 257–259°.

*Example 3*

A mixture containing 17.2 parts of 1-p-chlorophenyl-3-methyl - 5 - chloro - 6 - amino - 1,2,3,4 - tetrahydropyrimidine-2,4-dione, 68 parts of water, 24 parts of propyl alcohol, 5.8 parts of sodium hydroxide and 6.1 parts of mercaptoacetic acid is heated at the reflux temperature of the mixture for about 1 hour, then is stripped of the organic solvent by distillation. The residual mixture is diluted with water, then is allowed to stand at room temperature for about 16 hours and is finally filtered in order to remove a small amount of insoluble material. The resulting filtrate is acidified by means of hydrochloric acid, thus effecting separation of a gummy material which solidifies upon further standing. The resulting colorless solid is 1-p-chlorophenyl-3-methyl-5-carboxymethylthio-6 - amino - 1,2,3,4 - tetrahydropyrimidine - 2,4 - dione, which displays a melting point at about 233–235°.

*Example 4*

A mixture consisting of 6.84 parts of 1-p-chlorophenyl-3 - methyl - 5 - carboxymethylthio - 6 - amino - 1,2,3,4-tetrahydropyrimidine-2,4-dione and 28 parts of acetic anhydride is heated on the steam bath for about 4 hours, then is allowed to cool to room temperature, at which point it is diluted with approximately 100 parts of water. The resulting aqueous slurry is thoroughly stirred in order to decompose unreacted acetic anhydride and the resulting crude product is isolated by filtration, then washed on the filter with water and finally slurried again with aqueous bicarbonate in order to remove any unreacted starting material. The solid thus produced is isolated by filtration and washed on the filter with water to afford 5-p-chlorophenyl - 7 - methyl - 3,6,8 - triketopyrimido[5,4-b]1,4-thiazine, melting at about 301–303° with effervescence.

*Example 5*

To a mixture of 32.4 parts of 5-p-chlorophenyl-7-methyl-3,6,8-triketopyrimido[5,4-b]-1,4-thiazine with 315 parts of glacial acetic acid is added, with stirring over a period of about 15 minutes, 30 parts of sulfuryl chloride. Stirring at room temperature is continued for about 30 minutes, following which time the reaction mixture is heated at 90–95° for about 40 minutes. After cooling to about 60°, approximately 200 parts of hexane is added, and the resulting diluted mixture is allowed to cool to room temperature over a period of about one hour. The yellow crystalline solid thus produced is isolated by filtration, then is washed on the filter first with a 1:1 mixture of glacial acetic acid and hexane, then with pure hexane to yield the crude product. Recrystallization of that substance from dimethylformamide affords pulse 5-p-chlorophenyl - 7 - methyl - 2,3,6,8 - tetraketopyrimido[5,4 - b] 1,4-thiazine, melting at about 273–275°.

*Example 6*

A mixture containing 3.38 parts of 5-p-chlorophenyl-7-methyl - 2,3,6,8 - tetraketopyrimido[5,4-b]1,4 - thiazine and 80 parts of ethanol is heated at the reflux temperature for about 90 minutes, during which time the yellow starting material gradually dissolves and a colorless solid forms. The reaction mixture is then cooled to room temperature, and the colorless precipitate is collected by filtration, then washed on the filter with ethanol and dried in air. Further purification of that crude product by recrystallization from ethanol affords pure 2-ethoxycarbonyl - 4 - p - chlorophenyl - 5,7 - diketo - 6 - methylthiazolo[4,5-d]pyrimidine, melting at about 220–222° and represented by the following structural formula

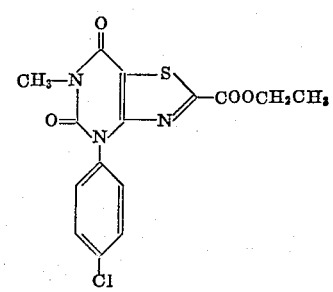

Example 7

To a solution of 0.4 part of sodium hydroxide in 25 parts of water is added 1.69 parts of 5-p-chlorophenyl-7-methyl - 2,3,6,8 - tetraketopyrimido[5,4 - b]1,4 - thiazine, and the resulting solution is kept at room temperature for about 90 minutes. Acidification of the solution with hydrochloric acid results in precipitation of the crude product as a yellow solid. That material is separated by filtration, washed successively on the filter with water and ethanol, then dried in air. The yellow solid thus obtained is 2-carboxy-4-p-chlorophenyl-5,7-diketo-6-methylthiazolo[4,5-d]pyrimidine, melting with strong effervescence at about 132–134°. This compound can be represented by the following structural formula

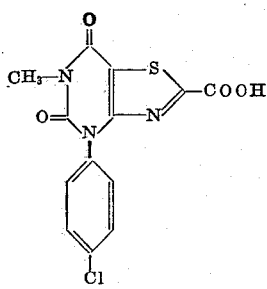

Example 8

Nine parts of 2-carboxy-4-p-chlorophenyl-5,7-diketo-6-methylthiazolo[4,5-d]pyrimidine is heated at about 80° for approximately 96 hours, during which time carbon dioxide is evolved. Recrystallization of the resulting crude product from ethanol affords pure 4-p-chlorophenyl-5,7-diketo-6-methylthiazolo[4,5-d]pyrimidine as a tan-colored solid, melting at about 188–190°. This compound is represented by the following structural formula

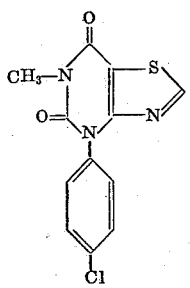

Example 9

To a mixture of 1.83 parts of 2-ethoxycarbonyl-4-p-chlorophenyl - 5,7 - diketo - 6 - methylthiazolo[4,5 - d]pyrimidine with 8 parts of ethanol is added 9 parts of concentrated ammonium hydroxide. The resulting reaction mixture is stored at room temperature, with occasional shaking, for about 5 days. The precipitate which forms gradually during the reaction period is separated by filtration, then is washed with water and dried. The resulting product is 2-carbamoyl-4-p-chlorophenyl-5,7-diketo-6-methylthiazolo[4,5-d]pyrimidine, melting at about 289–291°. It is further characterized by the following structural formula.

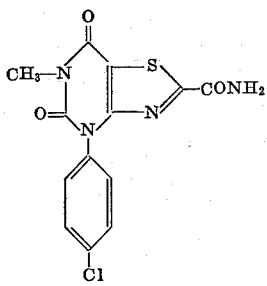

Example 10

A mixture containing 1.83 parts of 2-ethoxycarbonyl-4-p - chlorophenyl - 5,7 - diketo - 6 - methylthiazolo[4,5-d]pyrimidine, 8 parts of ethanol and 10 parts by volume of 30% aqueous methylamine is allowed to stand at room temperature with occasional stirring for about 6 days. The solid material which forms is collected by filtration, washed on the filter with water and dried to afford pure 2 - N - methylcarbamoyl - 4 - p - chlorophenyl - 5,7-diketo - 6 - methylthiazolo[4,5 - d]pyrimidine, which displays a melting point at about 237–239°. It is characterized by the following structural formula

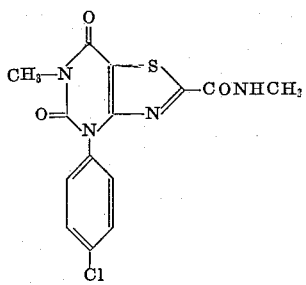

Example 11

A mixture containing 1.69 parts of 5-p-chlorophenyl-7-methyl - 2,3,6,8 - tetraketopyrimido[5,4 - b]1,4 - thiazine, 2.2 parts of propylamine and 15 parts of water is stirred at room temperature for about 6 hours, during which time the starting material dissolves and the product begins to form as a precipitate. The reaction mixture is then kept at room temperature for about 5 days, during which time precipitation of the product continues. That material is isolated by filtration, washed on the filter with water, dried and finally recrystallized from methanol to afford pure 2 - N - propylcarbamoyl - 4 - p - chlorophenyl - 5,7-diketo - 6 - methylthiazolo[4,5 - d]pyrimidine, melting at about 201–220° with decomposition. It is represented by the following structural formula

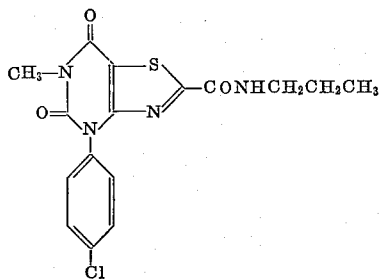

Example 12

A mixture containing 3.66 parts of 2-ethoxycarbonyl-4-p-chlorophenyl - 5,7 - diketo-6-methylthiazolo[4,5-d]pyrimidine, 9.8 parts of benzylamine and 30 parts of water is kept at room temperature, with occasional stirring, for about 5 days. During the reaction period the starting material gradually dissolves, and a granular solid begins to precipitate. At the end of the 5 day period the precipitated product is collected by filtration, is then washed on the filter with water and dried in air. Recrystallization of that substance from ethanol affords pure 2-N-benzylcarbamoyl-4-p-chlorophenyl-5,7-diketo-6 - methylthiazolo[4,5-d]pyrimidine as a colorless solid, melting at about 217–219°. This compound is represented by the following structural formula

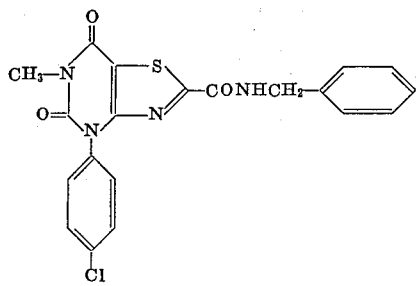

Example 13

To a stirred mixture of 25.2 parts of 1-p-chlorophenyl-3-methyl-6-amino - 1,2,3,4 - tetrahydropyrimidine-2,4-dione, 9.24 parts of sodium bicarbonate and 320 parts of methanol is added gradually, over a period of about 15 minutes, 16 parts of liquid bromine. The resulting reaction mixture is stirred at room temperature for about 30 minutes longer, then is allowed to cool at 0–5° for several hours. The precipitate which forms during that cooling period is separated by filtration, then is slurried with water, separated by filtration and finally allowed to dry in air. The resulting crude product is purified by recrystallization from ethanol to yield 1-p-chlorophenyl-3-methyl-5-bromo-6-amino-1,2,3,4-tetrahydropyrimidine - 2,4 - dione, which melts at about 227–228° with effervescence.

Example 14

A mixture containing 9.92 parts of 1-p-chlorophenyl-3-methyl-5-bromo-6-amino-1,2,3,4 - tetrahydropyrimidine-2,4-dione, 4.86 parts of sodium thiocyanate and 160 parts of ethanol is heated at the reflux temperature for about 5 hours, during which time the starting material dissolves and the product separates as an insoluble solid. At the end of the heating period, the reaction mixture is allowed to stand at room temperature for about 16 hours, then is cooled to 0–5° and filtered in order to remove the precipitated product. Washing of that product with ethanol followed by drying and recrystallization from dimethylformamide affords pure 2-amino-4-p-chlorophenyl-6-methyl-5,7-diketothiazolo[4,5-d]pyrimidine, melting at about 326–328° with decomposition. This compound is characterized further by the following structural formula

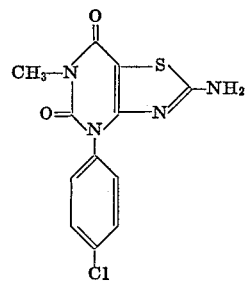

Example 15

The reaction of equivalent quantities of 1-m-chlorophenyl-6-amino-1,2,3,4-tetrahydropyrimidine - 2,4 - dione and diethyl sulfate according to the procedure described in Example 1 results in 1-m-chlorophenyl-3-ethyl-6-amino-1,2,3,4-tetrahydropyrimidine-2,4-dione.

When an equivalent quantity of 1-m-chlorophenyl-3-ethyl-6-amino-1,2,3,4 - tetrahydropyrimidine-2,4-dione is subjected to the successive processes of Examples 2–5, there is obtained 5-m-chlorophenyl-7-ethyl-2,3,6,8-tetraketopyrimido[5,4-b]1,4-thiazine.

The reaction of equivalent quantities of 5-m-chlorophenyl - 7 - ethyl-2,3,6,8-tetraketopyrimido[5,4-b]1,4-thiazine and methanol by the procedure described in Example 6 results in 2-methoxycarbonyl-4-m-chlorophenyl-5,7-diketo-6-ethylthiazolo[4,5-d]pyrimidine.

Example 16

The reaction of equivalent quantities of 2-methoxycarbonyl-4-m-chlorophenyl-5,7 - diketo - 6 - ethylthiazolo[4,5-d]pyrimidine and phenethylamine by the procedure described in Example 12 results in 2-N-phenethylcarbamoyl-4-m-chlorophenyl-5,7-diketo - 6 - ethylthiazolo-[4,5-d]pyrimidine.

Example 17

When an equivalent quantity of 2-methoxycarbonyl-4-m-chlorophenyl-5,7-diketo - 6 - ethylthiazolo[4,5-d]pyrimidine is substituted in the procedure of Example 10, there is obtained 2-N-methylcarbamoyl-4-m-chlorophenyl-5,7-diketo-6-ethylthiazolo[4,5-d]pyrimidine.

Example 18

When an equivalent quantity of 5-m-chlorophenyl-7-ethyl-2,3,6,8-tetraketopyrimido[5,4-b]1,4-thiazine is hydrolyzed according to the procedure of Example 7, there is obtained 2-carboxy-4-m-chlorophenyl-5,7-diketo-6-ethylthiazolo[4,5-d]pyrimidine.

Example 19

The decarboxylation of an equivalent quantity of 2-carboxy-4-m-chlorophenyl-5,7-diketo - 6 - ethylthiazolo-[4,5-d]pyrimidine according to the procedure described in Example 8 results in 4-m-chlorophenyl-5,7-diketo-6-ethylthiazolo[4,5-d]pyrimidine.

What is claimed is:

1. A compound of the formula

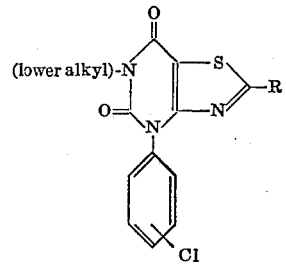

wherein R is selected from a group consisting of hydrogen and radicals selected from the class consisting of amino, carboxy, (lower alkoxy)carbonyl and those of the formula

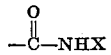

wherein X is a member of a class consisting of hydrogen, lower alkyl and phenyl(lower alkyl) radicals.

2. A compound of the formula

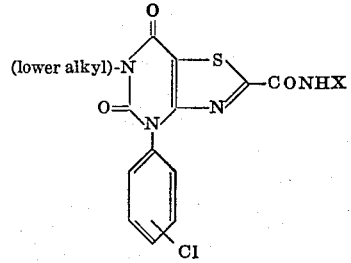

wherein X is a member of the class consisting of hydrogen, lower alkyl and phenyl(lower alkyl) radicals.

3. A compound of the formula

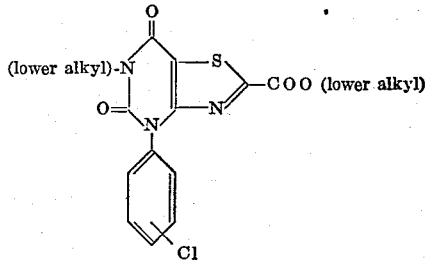

4. A compound of the formula

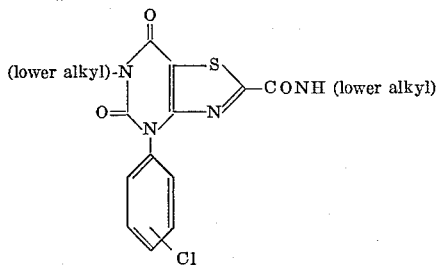

5. A compound of the formula

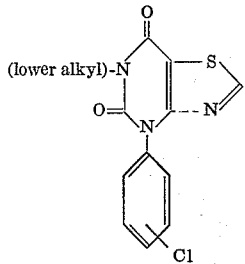

6. 2-ethoxycarbonyl - 4 - p-chlorophenyl-5,7-diketo-6-methylthiazolo[4,5-d]pyrimidine.

7. 2-carboxy-4-p-chlorophenyl - 5,7 - diketo-6-methylthiazolo[4,5-d]pyrimidine.

8. 4-p-chlorophenyl - 5,7 - diketo - 6 - methylthiazolo[4,5-d]pyrimidine.

9. 2-carbamoyl-4-p-chlorophenyl - 5,7 - diketo-6-methylthiazolo[4,5-d]pyrimidine.

10. 2-N-methylcarbamoyl-4-p-chlorophenyl - 5,7 - diketo-6-methylthiazolo[4,5-d]pyrimidine.

11. 2-N-propylcarbomyl-4-p-chlorophenyl - 5,7-diketo-6-methylthiazolo[4,5-d]pyrimidine.

12. 2-N-benzylcarbamoyl-4-p - chlorophenyl - 5,7 - diketo-6-methylthiazolo[4,5-d]pyrimidine.

13. 2-amino-4-p-chlorophenyl - 5,7 - diketo-6-methylthiazolo[4,5-d]pyrimidine.

No references cited.

ALEX MAZEL, *Primary Examiner.*

MARY U. O'BRIEN, *Assistant Examiner.*